US008658284B2

United States Patent
Chen et al.

(10) Patent No.: US 8,658,284 B2
(45) Date of Patent: Feb. 25, 2014

(54) POLYSILANE—POLYSILAZANE COPOLYMERS AND METHODS FOR THEIR PREPARATION AND USE

(75) Inventors: Wei Chen, Shanghai (CN); Eric Scott Moyer, Midland, MI (US); Binh Thanh Nguyen, Midland, MI (US); Sheng Wang, Midland, MI (US); Mark A. Wanous, Midland, MI (US); Xiaobing Zhou, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 174 days.

(21) Appl. No.: 13/504,579

(22) PCT Filed: Oct. 25, 2010

(86) PCT No.: PCT/US2010/053946
§ 371 (c)(1),
(2), (4) Date: Apr. 27, 2012

(87) PCT Pub. No.: WO2011/053551
PCT Pub. Date: May 5, 2011

(65) Prior Publication Data
US 2012/0214006 A1     Aug. 23, 2012

Related U.S. Application Data

(60) Provisional application No. 61/255,518, filed on Oct. 28, 2009.

(51) Int. Cl.
*B32B 9/00* (2006.01)
*B05D 5/12* (2006.01)
*C08G 77/62* (2006.01)

(52) U.S. Cl.
USPC ............ 428/447; 427/58; 524/588; 528/31; 528/39

(58) Field of Classification Search
USPC .......... 427/58; 524/588; 528/31, 39; 428/447
See application file for complete search history.

(56) References Cited

U.S. PATENT DOCUMENTS

| | | |
|---|---|---|
| 4,395,460 A | 7/1983 | Gaul |
| 4,636,440 A | 1/1987 | Jada |
| 4,778,907 A | 10/1988 | Gallo |
| 4,842,888 A | 6/1989 | Haluska et al. |
| 4,847,162 A | 7/1989 | Haluska et al. |
| 5,116,637 A | 5/1992 | Baney et al. |
| 5,262,201 A | 11/1993 | Chandra et al. |
| 5,268,496 A | 12/1993 | Geisberger |
| 5,310,720 A | 5/1994 | Shin et al. |
| 5,547,703 A | 8/1996 | Camilletti et al. |
| 6,096,483 A | 8/2000 | Harkness et al. |
| 6,310,168 B1 | 10/2001 | Shimizu et al. |
| 6,653,718 B2 | 11/2003 | Leung et al. |
| 6,656,241 B1 | 12/2003 | Hellring et al. |
| 6,908,801 B2 | 6/2005 | Saito |
| 6,967,172 B2 | 11/2005 | Leung et al. |
| 7,153,783 B2 | 12/2006 | Lu et al. |
| 7,224,019 B2 | 5/2007 | Hieda et al. |
| 7,238,587 B2 | 7/2007 | Hoshi et al. |
| 7,371,657 B2 | 5/2008 | Wellhausen et al. |
| 7,413,987 B2 | 8/2008 | Hieda et al. |
| 7,517,817 B2 | 4/2009 | Goo et al. |
| 2009/0032901 A1 | 2/2009 | Chen et al. |
| 2010/0112749 A1 | 5/2010 | Park et al. |

FOREIGN PATENT DOCUMENTS

| | | |
|---|---|---|
| EP | 2071616 | 6/2009 |
| WO | 9119688 | 12/1991 |

*Primary Examiner* — D. S. Nakarani
(74) *Attorney, Agent, or Firm* — Dow Corning Corporation; Claude F. Purchase; Erika Takeuchi

(57) ABSTRACT

A polysilane-polysilazane copolymer contains a polysilane unit of formula (I), and a polysilazane unit of formula (II), where each $R^1$ and each $R^2$ are each independently selected from H, Si, and N atoms, $R^3$ is selected from H, Si, or C atoms, $a \geq 1$, $b \geq 1$, and a quantity $(a+b) \geq 2$. The polysilane-polysilazane copolymer may be formulated in a composition with a solvent. The polysilane-polysilazane copolymer may be used in PMD and STI applications for trench filling, where the trenches have widths of 100 nm or less and aspect ratios of at least (6). The polysilane-polysilazane copolymer can be prepared by amination of a perchloro polysilane having (2) or more silicon atoms per molecule with a primary amine.

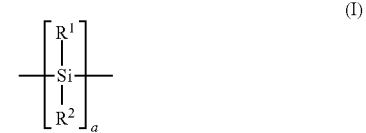

(I)

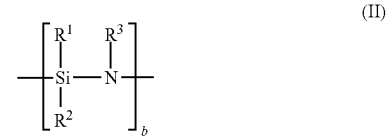

(II)

17 Claims, No Drawings

POLYSILANE—POLYSILAZANE COPOLYMERS AND METHODS FOR THEIR PREPARATION AND USE

CROSS-REFERENCE TO RELATED APPLICATIONS

This application is a U.S. national stage filing under 35 U.S.C. §371 of PCT Application No. PCT/US10/53946 filed on Oct. 25, 2010, currently pending, which claims the benefit of U.S. Provisional Patent Application No. 61/255,518 filed Oct. 28, 2009 under 35 U.S.C. §119 (e). PCT Application No. PCT/US 10/53946 and U.S. Provisional Patent Application No. 61/255,518 are hereby incorporated by reference in each of its entirety.

BACKGROUND OF THE INVENTION

1. Field of the Invention

This invention relates to a novel polysilane-polysilazane copolymer (copolymer) and methods for its preparation and use. The copolymer can be formulated into a composition. The copolymer is useful to prepare gap filling thin films or for casting fibers. The thin films can fill a gap with a width ≤100 nanometers (nm) and an aspect ratio (A/R)≥6.

2. Background

Shallow Trench Isolation (STI) can be used to achieve proper isolation between devices such as transistors in integrated circuits (ICs). STI involves forming trenches in a semiconductor substrate, and then filling the trenches with an insulating material. These filled trenches define the size and placement of the active regions. The pre-metal dielectric (PMD) layer on an IC isolates structures electrically from metal interconnect layers and isolates them electrically from contaminant ions that degrade electrical performance. PMD layers may require filling narrow trenches having a high A/R. Insulating material is deposited into the trenches to form barrier layers and planarize the topography. Chemical vapor deposition (CVD) and spin-on glass deposition (SOD) are techniques typically used to fill trenches on semiconductor substrates to form dielectric layers such as silicon dioxide ($SiO_2$) and silicon dioxide-based layers.

A typical CVD method involves placing a substrate in a reactor chamber where process gases are introduced and heated. This induces a series of chemical reactions that result in the deposition of a desired layer on the substrate. CVD methods can be used to prepare a silicon dioxide film made from, for example, silane which has the formula $SiH_4$ or tetraethoxysilane which has the formula $Si(OC_2H_5)_4$. Boron and phosphorus doped silicon glass (BPSG) deposited by CVD is also a PMD material used in CVD methods. The BPSG films are first deposited in a CVD chamber and thereafter are furnace annealed at 850° C., which is above BPSG reflow temperature, to eliminate voids and improve planarization. However, with the dimensions of IC features quickly approaching nano-scale, the filling of these narrow, high aspect ratio (A/R≥6) trenches with void-free BPSG becomes difficult even after a high temperature annealing. The stringent gap fill of PMD becomes even more challenging as the industry strives to process PMD films at a lower annealing temperature, for instance, at 700° C. Various types of CVD processes are known, such as atmospheric pressure CVD, low pressure CVD, or plasma enhanced CVD. However, CVD methods may suffer from the drawback that when trench dimensions approach nano-scale, sufficient trench filling becomes difficult, particularly with dynamic random access memory (DRAM) devices, due to the voids formed during the process. The CVD techniques, therefore, are unsuitable for filling trenches with narrow widths and high A/R.

In a typical SOD method, a solution containing a film-forming material, such as a methylsilsesquioxane (MSQ) resin or a hydrogensilsesquioxane (HSQ) resin, is deposited on a spinning substrate to form a uniform thin film. The spinnability of the solution directly influences the quality and performance of the thin film. After the film-forming material is deposited on the substrate, the film-forming material is cured. Good trench filling properties can be obtained if the cured film-forming material in the trench can resist HF wet etching. To achieve resistance to HF wet etching, the cured material in the trench must be dense and/or hydrophobic to afford an HF etching rate comparable to thermal silicon dioxide. In the SOD process, it is known that MSQ resin can fill the small gaps with good etch resistance due to the introduction of hydrophobic carbon. However, because both STI and PMD applications are in the most sensitive regions of a semiconductor chip, severe electrical problems, such as leakage, can be caused by carbon. Thus, IC manufacturers, particularly dynamic random access memory (DRAM) device manufactures, are interested in finding a carbon free SOD material solution for trench filling applications.

HSQ resin has been considered as a candidate for trench filling applications. However, HSQ resin may suffer from the drawback that without the carbon of the MSQ resin, the thin film formed after cure in nano-scale trenches having high aspect ratios has insufficient density resulting in insufficient HF wet etch resistance. The narrow width and high A/R of a given nano-scale trench may prevent the HSQ resin from forming a dense film at the bottom half of the trench during a high temperature cure, e.g., a target cure condition for PMD applications may be heating at 700° C. in steam for 30 minutes. The $SiO_2$ films derived from spin-on HSQ resins may suffer from the drawbacks of being either severely damaged or completely etched away when exposed to HF etchants in the trenches. This unsatisfactory wet etch resistance is likely the result of inhomogeneous densification in the trenches or due to the formation of low-density regions during conversion to $SiO_2$. In highly confined geometries, such as narrow, high A/R trenches, the density of the cured film is influenced by several factors including the degree of shrinkage, adhesion to the trench walls, moisture diffusion through the film, and temperature. A HSQ resin film that is simultaneously cured and annealed tends to form a dense skin on the surface of the trench, which limits mass transfer to the bulk film, especially the corners of the bases of the trenches. This results in less densification in these areas that, as a result, are much more susceptible to HF etch damage. An HSQ solution formulated with colloidal silica particles and binder technology was developed to increase the gap fill density, which showed improved etch resistance. However, solution stability and porous appearance made this formulation impractical to use. An ozone cure chemistry was applied to a low molecular HSQ formulation. The trench densification was achieved and the cured HSQ resin in the nano-scale gaps demonstrated good etch resistance. However, ozone cure is not well accepted by IC manufacturers. Similarly, a hydrogen peroxide and ammonium hydroxide combination approach was used to cause low temperature oxidation of HSQ resin in a trench. However, the stability and safety of peroxide solution are major concerns to IC manufacturers. Alternatively, nitrous oxide ($N_2O$) can be used to cure HSQ resin films, resulting very low etch rate in a 200:1 HF solution. However, for nano-scale trenches, this method suffers from the drawback of yielding etch resistance only on the top part of a trench.

Conventional polysilazanes (PSZs) have also been evaluated by a number of IC companies. Conventional PSZs have been prepared by amination of mixtures containing methylchlorosilanes and methylchlorodisilanes with ammonia, primary amines, or secondary amines. Alternatively, conventional PSZs have been prepared by Wurtz-type co-condensation of dichlorosilanes that contains Si—N—Si bonding. This synthesis of PSZs can be achieved by co-feeding alkyl substituted dichlorosilane and 1,3-dichlorodisilazane to a sodium suspension. The isolated linear PSZ was clear and mobile, and had a weight average molecular weight Mw of 2,500. Each silicon atom in this PSZ was bonded to at least one methyl group. Conventional PSZs may suffer from the drawbacks of being expensive and having poor stability. Certain PSZs also suffers from the drawback of containing SiC bonds, which provide a source of undesirable carbon. The conventional PSZs are not proper precursors for SiN, SiON or $SiO_2$ ceramic films that have been widely used in semiconductor devices as dielectric or barrier materials because these PSZs may suffer from the drawbacks of being difficult to process into films due to a low crosslinking degree, or could have the problems of metal contamination or of incorporation of Si—C bonds that are difficult to remove by most film processing methods.

Therefore, there is a continuing need in the IC industry to provide a film forming material that can fill trenches with narrow widths and high aspect ratios without voids in the trenches, and that form dense films when the materials are cured.

BRIEF SUMMARY OF THE INVENTION

A polysilane-polysilazane copolymer contains: a polysilane unit of formula

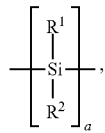

and a polysilazane unit of formula

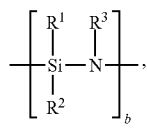

where $R^1$ and $R^2$ are each independently selected from H, Si, and N atoms, $R^3$ is selected from H, Si, or C atoms, $a \geq 1$, $b \geq 1$, and a quantity $(a+b) \geq 2$. The copolymer may be formulated in a composition with a solvent. The copolymer may be used for trench filling applications or for fiber casting applications. The copolymer is free of SiC bonds. Free of SiC bonds means that the copolymer contains no SiC bonds or an amount of SiC bonds insufficient to prevent a composition containing the copolymer from filling trenches on a substrate, where the trenches have widths ≤100 nm and A/R≥6. The copolymer can be prepared by aminolysis of a perchloro polysilane having 2 or more silicon atoms per molecule with an amine, ammonia or a silazane.

DETAILED DESCRIPTION OF THE INVENTION

All amounts, ratios, and percentages are by weight, unless otherwise indicated. The following is a list of definitions, as used herein.

The articles "a", "an" and "the" each refer to one or more.

"Aspect ratio" or "A/R" means trench height divided by trench width.

"Combination" means two or more items put together by any method.

"Nano-scale" means trenches having a width ≤100 nm, alternatively, <100 nm, alternatively ≤80 nm, alternatively ≤70 nm, alternatively ≤45 nm, alternatively ≤40 nm, alternatively ≤20 nm, and alternatively ≤5 nm.

"Spinnable" and "spinnability" mean that a composition can be used effectively in an SOD method.

"Substantially inert" means an environment that contains <50 ppm of oxygen ($O_2$). Preferably, a substantially inert environment contains <10 ppm of $O_2$.

Copolymer

A copolymer consists essentially of:
a polysilane unit of formula

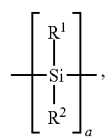

and
a polysilazane unit of formula

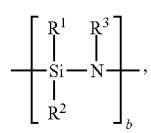

where
$R^1$ and $R^2$ are each independently selected from H, Si, and N atoms,
$R^3$ is selected from H, Si, or C atoms,
$a \geq 1$,
$b \geq 1$, and
a quantity $(a+b) \geq 2$.

The carbon atom in $R^3$ may be a carbon atom in a monovalent hydrocarbon group. Suitable monovalent hydrocarbon groups include alkyl groups, such as methyl, ethyl, propyl and butyl; cycloalkyl groups such as cyclopentyl and cyclohexyl; and aryl groups, such as phenyl, tolyl, benzyl, and xylyl. Alternatively, each monovalent hydrocarbon group may be an alkyl group of 1 to 4 carbon atoms. Alternatively, the quantity $(a+b) \geq 3$, alternatively the quantity $(a+b) \geq 4$, the quantity $(a+b)$ ranges from 2 to 10, and alternatively the quantity the quantity $(a+b)$ ranges from 3 to 6. Alternatively, $R^1$ and $R^2$ may be different.

The copolymer contains the polysilane and the polysilazane units are shown above. However, the copolymer may optionally contain one or more additional units that are free of SiC bonds. The copolymer may further include a SiH containing unit of formula

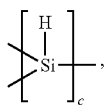

where c≥1, a unit of formula

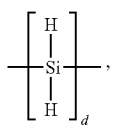

where d≥1 (and this unit differs from the polysilane unit described above,) or both of these SiH containing units.

The copolymer may be a solid or fluid under ambient conditions. The copolymer may be one single copolymer, or a combination of two or more copolymers that differ in at least one of the following properties: structure, viscosity, average molecular weight, and sequence of units. The copolymers may contain variable numbers of Si atoms in each repeating unit. The connection of these Si atoms can be linear, branched, cyclic or three dimensionally bridged. The number and connection of Si atoms are carried over from the perchloro polysilane feedstock used to prepare the copolymer, as discussed below.

With respect to the copolymer, the phrase "consisting essentially of" means that the copolymer is free of SiC bonds. "Free of SiC bonds" in this context means that the copolymer contains no SiC bonds or an amount of SiC bonds insufficient to prevent the copolymer, or a composition containing the copolymer, from trench filling a substrate having nano-scale trenches with A/R≥6.

Method of Using the Copolymer

The copolymer described above may be applied to a substrate and used to form a cured film. A method for forming a cured film comprises:

1) applying the copolymer described above to a substrate to form an uncured film, and 2) heating the uncured film to form a cured film. When the copolymer is a liquid at ambient conditions, the copolymer may be applied neat to the substrate. Alternatively, the method may further comprise formulating the copolymer into a composition before step 1).

The composition may comprise:
(a) 5% to 20% of the copolymer described above, and
(b) 80% to 95% of a solvent.

The solvent may be a polyorganosiloxane, such as polydimethylsiloxane with a viscosity of 5 to 100 centiStokes (cSt). Suitable polydimethylsiloxanes are known in the art and are commercially available as DOW CORNING® OS Fluids® from Dow Corning Corporation of Midland, Mich., U.S.A. Alternatively, the solvent may be an organic solvent. Examples of such organic solvents include acetates such as PGMEA (propylene glycol monomethyl ether acetate); ether-type solvents such as dibutylether, diethylether, THF (tetrahydrofuran), dimethyl ether, or phenylmethyl ether; ketones, acetone, and poly(vinyl pyrrolidone); aromatic hydrocarbon solvents such as toluene, benzene, xylene, or mesitylene; aliphatic hydrocarbon solvents such as hexane (and other cycloalkyl compounds); and combinations thereof.

In the method described above, step 1) may be performed by any convenient technique. Suitable techniques are exemplified by spin coating, extrusion coating, dip coating, and spray coating. When a solvent is present, the method may optionally further comprise a solvent removal step after step 1). Solvent removal may be performed by exposure to ambient conditions for a period of time, vacuum, heating, or combinations thereof.

The substrate may be any substrate useful in the IC industry, such as Si, Ge, and other group III-V semiconductor substrates. For example, the substrate may be a semiconductor wafer. The semiconductor wafer may be a bare wafer or a patterned wafer. The patterned wafer has, on its surface, a nano-scale trench. The composition may be applied to this surface to fill the trench. The nano-scale trench may have a width ≤100 nm, alternatively 5 nm to 100 nm, alternatively 20 nm to 70 nm, alternatively 40 nm to 100 nm, alternatively 40 nm to 70 nm, alternatively 45 nm to 80 nm, alternatively 20 nm to 45 nm, alternatively 40 nm to 45 nm, and alternatively 5 nm to 20 nm. The nano-scale trench may have A/R≥6, alternatively A/R≥7, alternatively A/R may range from 6 to 60, alternatively A/R may range from 10 to 60, alternatively A/R may range from 6 to 40, and alternatively A/R may range from 7 to 20.

Step 2) may comprise: i) a low temperature moisture soaking step and ii) a high temperature annealing step. The low temperature moisture soaking step may comprise exposing the uncured film to atomspheric moisture or steam at a temperature ranging from 22° C. to 200° C. for a time ranging from 30 minutes to 60 minutes. The low temperature moisture soaking step may optionally further comprise thereafter heating at a temperature of at least 400° C. for 30 minutes to 60 minutes. The high temperature annealing step may comprise heating the product of step i) at a temperature ranging from 600° C. to 900° C., in an environment comprising $N_2O$, $N_2$, or steam. Alternatively, the temperature for step ii) may range from 800° C. to 900° C.

The product of step 2) is a cured film. The cured film may be fully condensed. Alternatively, the cured film may be partially condensed. Whether the cured film is fully condensed or partially condensed depends on the exact times and temperatures selected for the high temperature annealing step. The difference is measured by infra-red spectroscopy (IR). Fully condensed means the copolymer has gone through high temperature annealing; to render the copolymer fully crosslinked and insoluble with a refractive index (RI) approaching 1.44. Partially condensed means the copolymer has some $N-R^3$ left, but not as much as before step 2)i).

The cured film may be free of SiC bonds. Without wishing to be bound by theory, it is thought that the chemical composition of the cured film will depend on various factors including the environment selected for annealing. For example, when a steam environment is selected, the cured film will be a $SiO_2$ film. Alternatively, when a $N_2O$ environment is selected, the cured film will include both SiN and $SiO_2$. With respect to the cured film, the phrase "consisting essentially of" means that the cured film is free of SiC bonds. "Free of SiC bonds" in this context means that the cured film contains no SiC bonds or an amount of SiC bonds insufficient to prevent the cured film from trench filling a substrate having nano-scale trenches with A/R≥6.

The method described above is suitable to form a cured film for PMD or STI on a semiconductor wafer. The method is useful for PMD and STI applications in ICs, such as DRAM devices.

Alternatively, the polysilane-polysilazane copolymer may be used in a fiber casting application. Fiber casting ability may be measured by heating to melt a copolymer that is a solid at room temperature. A substrate, such as a glass rod, may be contacted with the copolymer and then moved away to determine how far a fiber will extend before break between the melted copolymer and the glass while the copolymer is a liquid. Film forming capability is proportional to fiber forming capability, i.e., if a copolymer is useful to form a uniform film with good trench filling properties, the copolymer may be expected to be useful for fiber forming applications as well.

Method of Making the Copolymer

The copolymer described above may be prepared by a method comprising: I) reacting a perchloro polysilane having at least 2 silicon atoms per molecule with an amine. The method may optionally further comprise II) heating the product of step I) in a substantially inert environment at an elevated temperature, thereby increasing molecular weight and viscosity of the copolymer. As low viscosity/low Mw copolymers are condensed and low boiling by-products are removed, carbon content will decrease and weight will decrease. This results in copolymers having higher molecular weight and higher viscosity. Proton NMR ($^1$H NMR) line broadening can be used to reflect increase of molecular weight. The viscosity increase leads to film thickness increase as film thickness in a spin coating process is governed by viscosity of the copolymer or composition cast. So, film thickness increases after thermal condensation of the product of step I). How much film thickness increases depends on the type of copolymer (e.g., linear vs. branched) and how much heating is applied.

The perchloro polysilane used in the above method may have a structure selected from linear, branched, cyclic or three dimensionally bridged. The copolymer produced by the method will have the structure of the perchloro polysilane. The perchloro polysilane has at least two silicon atoms per molecule. Alternatively, the perchloro polysilane may have at least 3 silicon atoms per molecule. Alternatively, the perchloro polysilane may have up to 10 silicon atoms per molecule. Alternatively, the perchloro polysilane may have 2 to 6 silicon atoms per molecule. The perchloropolysilane is exemplified by, but not limited to, the following:

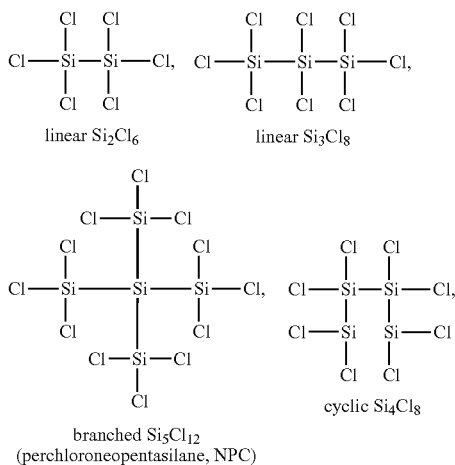

linear $Si_2Cl_6$  linear $Si_3Cl_8$ branched $Si_5Cl_{12}$
(perchloroneopentasilane, NPC)

cyclic $Si_4Cl_8$

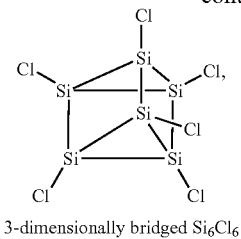

3-dimensionally bridged $Si_6Cl_6$ and combinations thereof.

The amine may have the formula $NR^4H_2$, where $R^4$ is a primary amine or a monovalent hydrocarbon group. Suitable monovalent hydrocarbon groups include alkyl groups, such as methyl, ethyl, propyl and butyl; cycloalkyl groups such as cyclopentyl and cyclohexyl; alkenyl, such as vinyl, allyl, and butenyl; and aryl groups, such as phenyl, tolyl, benzyl, and xylyl. Alternatively, each $R^4$ may be an alkyl group of 1 to 4 carbon atoms. Examples of suitable primary amines include, but are not limited to, methylamine, ethylamine, propylamine, and butyl amine. Diamines such as ethylene diamine may alternatively be used.

Step I) of the method may be performed by combining an amount of perchloro polysilane with a molar excess of the amine. Step I) may be performed at a temperature ranging from −78° C. to 50° C., for a period time ranging from 2 to 10 hours under a substantially inert atmosphere. Solvent can be used, but is not required. The excess amine may act as a solvent. After step I), an optional step may be added to remove components from the resulting reaction mixture before step II). For example, amine hydrochloride by-products may be removed by filtration and solvent and/or unreacted primary amine may be removed by stripping, for example at $10^{-2}$ torr to 1 atmosphere and heating at a temperature ranging from 0° C. to 150° C. for a time ranging from 30 minutes to 24 hours.

Step II) of the method is performed by heating the copolymer prepared in step I) in a substantially inert atmosphere. The temperature may range from 50° C. to 250° C., and the copolymer may be heated for a time ranging from 30 minutes to 24 hours.

A cyclic copolymer may be made using a neat process (i.e., without solvent). The cyclic copolymer may be prepared by reacting a molar excess of a primary amine (such as ethylamine) with a perchloro polysilane (such as hexachlorodisilane), thereby forming a cyclic copolymer exemplified below.

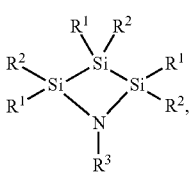

where $R^1$ and $R^2$ are each independently selected from H, Si, and N atoms, and $R^3$ is selected from H, Si, or C atoms.

$Si_5$ copolymers (i.e., copolymers made using a perchloro polysilane having an average of 5 silicon atoms per molecule) could be prepared, for example, by aminolysis of perchloroneopentasilane (NPC) with methylamine as shown in Equation 1. Without wishing to be bound by theory, it is thought that order of addition of raw materials may influence molecular weights of copolymers produced. When methylamine was fed into NPC, a viscous liquid copolymer product was initially isolated, and quickly solidified. When NPC was fed into methylamine, the isolated copolymer product was a viscous liquid having a good phase stability. Analyzed with $^1$H NMR, the signal of the N-Me groups was much broader for the solid, resinous copolymer made by adding methylamine to NPC than for the liquid, resinous copolymer made by adding NPC to methylamine indicating that the solid has higher molecular weights than the liquid. For purposes of this application, the abbreviation 'Me' represents a methyl group. A $^{29}$Si NMR analysis concluded that the SiSi$_4$ repeating units remained intact in both of these copolymers. The high and low $M_w$ Si$_5$ copolymers were soluble in solvents such as mesitylene and dibutyl ether, even though the solutions of the high $M_w$ Si$_5$ copolymer were less stable than the solutions of the low $M_w$ Si$_5$ copolymer.

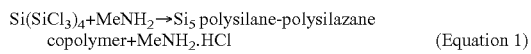

$$\text{Si(SiCl}_3)_4 + \text{MeNH}_2 \rightarrow \text{Si}_5 \text{ polysilane-polysilazane copolymer} + \text{MeNH}_2.\text{HCl} \quad \text{(Equation 1)}$$

Alternatively, a method for making the polysilane-polysilazane copolymer comprises: I) reacting a perchloro polysilane having at least 2 silicon atoms per molecule with ammonia (NH$_3$). The perchloropolysilane is as described above. For example, the ammonolysis of NPC gave insoluble copolymer as shown below in Equation 2. The insoluble copolymer prepared by the method using ammonia is useful for preparing ceramic materials. Step II) may be eliminated from this method because after step I), polymerization is complete. However, the product of step I) may be heated to high temperature to form a ceramic.

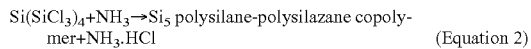

$$\text{Si(SiCl}_3)_4 + \text{NH}_3 \rightarrow \text{Si}_5 \text{ polysilane-polysilazane copolymer} + \text{NH}_3.\text{HCl} \quad \text{(Equation 2)}$$

Alternatively, a method for making a polysilane-polysilazane copolymer comprises: I) reacting a perchloro polysilane with an organosilazane to form a liquid intermediate under conditions of temperature ranging from room temperature to 100° C., for a time period ranging from 30 minutes to 24 hours, and II) heating the intermediate to polymerize and form the copolymer at temperature ranging from 50° C. to 250° C. for a time period ranging from 30 minutes to 24 hours. The heating step may be performed at atmospheric pressure or under vacuum, for example at a pressure ranging from 10$^{-2}$ torr to 1 atmosphere. An example is shown below in Equations 3 and 4, in which NPC was reacted with stoichiometrically insufficient hexamethyl disilazane (HMDZ) to form a liquid intermediate, which was then thermally polymerized to a viscous liquid product at up to 250° C. The product was an oily copolymer, which was stable and soluble in the solvents described herein.

$$\text{Si(SiCl}_3)_4 + \text{HN(SiMe}_3)_2 \rightarrow \text{Si}_5(\text{NHSiMe}_3)_6\text{Cl}_6 + \text{ClSiMe}_3 \quad \text{(Equation 3)}$$

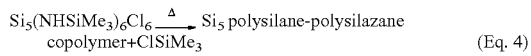

$$\text{Si}_5(\text{NHSiMe}_3)_6\text{Cl}_6 \xrightarrow{\Delta} \text{Si}_5 \text{ polysilane-polysilazane copolymer} + \text{ClSiMe}_3 \quad \text{(Eq. 4)}$$

The method may further comprise incorporating SiH containing units into the copolymer. The method may further comprising adding a SiH functional chlorosilane, such as dichlorosilane (DCS, H$_2$SiCl$_2$) or trichlorosilane (TCS, HSiCl$_3$), in step I). The SiH functional chlorosilane may be mixed with the perchloro polysilane. The amount of SiH functional chlorosilane may range from 0 mole SiH functional chlorosilane/1 mole perchloro polysilane to 99 moles SiH functional chlorosilane/1 mole perchloropolysilane. Without wishing to be bound by theory it is thought that the film- and fiber-forming capability of the copolymer can be improved by incorporating the units of the formulas

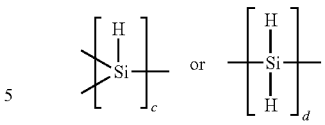

or a combination thereof (as described above) with the use of an SiH functional chlorosilane in step I). For example, to make an exemplary such copolymer, methylamine was fed into a mixture of DCS and NPC, see for example, Equation 5, below.

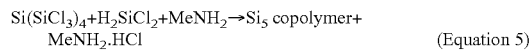

$$\text{Si(SiCl}_3)_4 + \text{H}_2\text{SiCl}_2 + \text{MeNH}_2 \rightarrow \text{Si}_5 \text{ copolymer} + \text{MeNH}_2.\text{HCl} \quad \text{(Equation 5)}$$

The ingredients used in the above methods may be free of species that introduce SiC bonds into the copolymer. "Free of species that introduce SiC bonds into the copolymer" means that the ingredients used in the method contain no species that introduce SiC bonds into the copolymer, or that the ingredients used in the method contain an amount of species that introduce SiC bonds to the copolymer only in an amount insufficient to prevent a composition containing the copolymer from filling trenches on a substrate after the method is performed, where the trenches have widths ≤100 nm and A/R≥6.

EXAMPLES

These examples are included to demonstrate the invention to one of ordinary skill in the art. However, those of skill in the art should, in light of the present disclosure, appreciate that many changes can be made in the specific embodiments which are disclosed and still obtain a like or similar result without departing from the spirit and scope of the invention. These examples should not be interpreted to limit the scope of the invention set forth in the claims.

Reference Example 1

Gel Permeation Chromatography (GPC)

GPC data was collected using a Waters 515 pump, a Waters 717 autosampler, and a Waters 2410 differential refractometer. The separation was made with two (300 mm×7.5 mm) Polymer Laboratories Plgel 5 micrometer (um) Mixed-C columns, preceded by a Plgel 5 um guard column. High performance liquid chromatography (HPLC) grade toluene eluent was used at 1 0 milliliter per minute (mL/min) flowrate, and the columns and detector were heated to 45° C. An injection volume of 50 microliters (uL) was used and the sample prefiltered through a 0.45 um polytetrafluoroethylene (PTFE) syringe filter. Molecular weight averages were determined relative to a calibration curve (4$^{th}$ order) created using polydimethylsiloxane (PDMS) standards covering the molecular weight range of 1,300-850,000.

Reference Example 2

$^{29}$SiNMR $^{29}$Si NMR data was collected on a Varian Mercury 300 using benzene-d$_6$ solvent. The experiment was conducted with a relaxation delay of 60 seconds (sec) with a gated decoupled pulse sequence using a 5 millimeter (mm) switchable PFG probe. Alternatively, the sample was run on a Mercury 400 using a Nalorac 16 mm silicon free Pulsetune® probe, optionally with 0.03 M chromium acetylacetonate, Cr(acac)$_3$, as a relaxation reagent; and gated decoupling to ensure quantitative conditions. Both used 90 degree pulsewidth and the 400 used a 12 sec relaxation delay.

Reference Example 3

Proton NMR ($^1$HNMR)

Solution $^1$H NMR data were collected on a Varian VXR 300 spectrometer operating at 299.949 MHz for $^1$H. The samples were dissolved in C$_6$D$_6$. The linewidth was measured at the half height of a signal. The broadening of linewidth was qualitatively related to the increase of molecular weight for the same type of polymers.

Reference Example 4

FT-IR

Infrared spectra were recorded at a resolution of 4 cm$^{-1}$ on a Nicolet 5SXB FT-IR spectrometer. Liquid samples were sandwiched between polished KBr disks. Reference Reference Example 5

Raman Spectroscopy

The instrument used for Raman spectroscopy was a HoloLab Series 5000 Raman Microscope from Kaiser Optical, Inc. (Ann Arbor, Mich., USA). This was a dispersive Raman system which used fiber optics to transfer light between the spectrograph and the microscope, a holographic Notch® filter to remove the Rayleigh line, holographic dispersion optics in the grating, and a CCD detector. The laser was a doubled Nd:YAG having output at 532 nm (green) and 50 mW power. All spectra were measured with a 50× focusing objective on the microscope, and the spectral resolution was 5 cm$^{-1}$. All spectra were corrected for dark background response and for cosmic ray interference. Total spectral acquisition times varied from 40 seconds to 16 minutes, and were adjusted for each sample depending on the strength of the Raman bands being measured.

Example 1

Preparing a Si$_2$ Copolymer with a Primary Amine

To prepare a Si$_2$ resinous copolymer by the aminolysis method, 1.79 kg (6.66 mol) of hexachlorodisilane was reacted with 4.80 kg (106.5 mol) of ethylamine to form a low molecular weight copolymer and hexakis(ethylamino)disilane monomer in 10.79 kg of hexanes solvent at a temperature ranging from –20° C. to 25° C. and pressure 1 atmosphere under substantially inert conditions. After the salt by-product was filtered and the unreacted ethylamine and hexanes solvent were stripped away, the low molecular weight copolymer and the monomer were isolated as a clear low viscosity liquid. After most of the monomer was removed by vacuum stripping, the residue was heated in N$_2$ at 150° C. for 24 hours to yield a higher molecular weight copolymer that became much more viscous. This high molecular weight copolymer was dip coated in a neat state on a glass substrate and formed a hard, clear and smooth film after being exposed in air for a short period of time. A solution of this copolymer was suitable for SOD on semiconductor wafers to form thin films.

Example 2

Preparing a Si$_3$ Copolymer with a Primary Amine

To prepare a Si$_3$ resinous copolymer by the aminolysis method, 5.90 g (21.9 mmol) of hexachlorodisilane was added to 29.95 g (664.4 mmol) of ethylamine at a temperature ranging from –20° C. to 25° C. and pressure 1 atmosphere under substantially inert conditions. The upper liquid product phase was separated from the lower liquid salt phase. The upper phase was then subjected to a vacuum stripping of unreacted ethylamine and low boiler by-products, and a subsequent filtration. The isolated residue (4.50 g) was a clear liquid which contained a predominating Si$_3$ monomer characterized with $^1$H NMR and mass spectrophotometry (MS) (see below for the structure, in which Et represents an ethyl group).

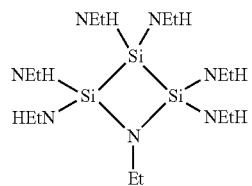

N-ethyl-hexakis(ethylamino)cyclosiladisilazane

The residue was heated in N$_2$ at 150° C. for 24 hours to yield a higher molecular weight copolymer that became much more viscous. A solution of this copolymer was suitable for SOD on semiconductor wafers to form thin films.

Two unique phenomena make the synthesis of N-ethyl-hexakis(ethylamino)cylcosiladisilazane easy to operate and scale up. First, EtNH$_2$.HCl salt completely dissolves in ethylamine at 30 wt % salt content. Second, the separation of liquid product and salt phases is clean in a two phase liquid separation. Such a high solubility of the corresponding amine hydrochloride salts in corresponding amines has not been observed for t-BuNH$_2$.HCl in t-BuNH$_2$, EtMeNH.HCl in EtMeNH, Et$_2$NH.HCl in Et$_2$NH, or Me$_2$NH.HCl in Me$_2$NH in the synthesis of bis(t-butylamino)silane (BTBAS), tetrakis(ethylmethylamino)silane (4EMAS), tetrakis(diethylamino)silane (4DEAS) or tetrakis(dimethylamino)silane (4DMAS).

The dissolved EtNH$_2$.HCl salt pushes out the N-ethyl-hexakis(ethylamino)cylcosiladisilazane to form two liquid phases. The phase separation makes the isolation of product as easy as a decantation. Therefore, the filtration of salts used to isolate BTBAS, 4EMAS, 4DEAS and 4DMAS is avoided in the synthesis of Si$_3$(NEtH)$_6$(μ-NEt).

Example 3 and Comparative Example 1

SOD Using Copolymer Solution and HSQ Solution

A solution contained 20% solid copolymer from Example 1, with the balance being DOW CORNING® OS-20 Fluid, which is commercially available from Dow Corning Corporation of Midland, Mich., U.S.A. The solution was spin coated onto bare and patterned silicon wafer surfaces to form a film on each wafer surface. In the low temperature moisture soaking step, the film was initially kept at 200° C. for 30 minutes in a steam environment. Then, the temperature was raised to 400° C. for 30 minutes and, finally, the temperature was raised to 800° C. for 30 minutes in order to perform a condensation reaction in an annealing step. The heating steps at 400° C. and 800° C. were also performed in a steam environment. The film was converted into SiO$_2$ as shown by FT-IR. Etch resistance of the resulting cured film was obtained in the sub-100 nm trenches for the patterned silicon wafer in a 100:1 HF solution. The trenches were 56.2 nm wide at their widest point, and the trenches were filled with a film of void-free SiO$_2$.

For comparative purposes, samples were made as above except that HSQ resin was used instead of the solid copolymer. The cured HSQ resin in the trenches of the patterned silicon wafer was completely etched out after the etch test.

Example 4

Preparing a Copolymer with HMDZ

To prepare a Si$_5$ copolymer via the silazane route, 16.6 ml (79.6 mmol) of HMDZ was added to 7.55 g (13.3 mmol) of NPC pre-dissolved in 30.2 g of toluene at 1:2 HN(SiMe$_3$)$_2$:SiCl molar ratio. Then the low boilers were distilled at up to 196° C. under ambient pressure. The residue was polymerized at 250° C. under 10 torr pressure, and the volatile condensation by-products were constantly removed. As a result, 5 g of viscous liquid was isolated as the product, which was characterized with $^1$H and $^{29}$SiNMR, FT-IR, Raman spectroscopy and GPC. The molecular weights of the product were determined to be number average molecular weight (M$_n$) 706 and weight average molecular weight (M$_w$) 903 with GPC. The FT-IR, Raman and $^{29}$SiNMR analyses suggested that a portion of the Si—Si bonds were cleaved.

Example 5

Preparing a Si$_5$ Copolymer with a Primary Amine

To prepare a Si$_5$ copolymer resin by the aminolysis method, a solution of 54.1 g (1.74 mol) of MeNH$_2$ in 191.7 g of toluene was added to a solution of 37.4 g (0.0661 mol) of NPC in 148.3 g of toluene at 0° C. After bodying for 1 hr at the ambient temperature, the reaction mixture was filtered to remove the salt by-product. The clear filtrate was subject to a vacuum stripping to remove all the volatiles. About 19.0 g of solid, resinous copolymer was isolated, and characterized with $^1$H and $^{29}$5i NMR. The copolymer was dissolved in mesitylene for film deposition.

Example 6

Preparing a Si$_5$ Copolymer with a SiH Functional Chlorosilane

A Si$_5$ copolymer was prepared with DCS and NPC in a 2:1 molar ratio. A solution of 33.7 g (1.08 mol) of methylamine in 94.8 g of toluene was added to a mixture of 17.4 g (0.0308 mol) of NPC pre-dissolved in 69.2 g of toluene and 6.2 g of DCS (0.0616 mol) pre-dissolved in 18.7 g of xylene at 0° C. After bodying at the ambient temperature for 2 hr, the reaction mixture was filtered to remove the salt by-product. The clear filtrate was subject to a vacuum stripping to remove the volatiles. About 6.4 g of oily resin intermediate was isolated. The intermediate was vacuum distilled at 100° C. for 1 hr for further condensation. The thermal treatment resulted in 5.3 g of molten, resinous copolymer which quickly solidified at the ambient temperature. The copolymer was characterized with $^1$H and $^{29}$SiNMR. It was dissolved in mesitylene for spin deposition of films or melted for pulling of fibers. The film- and fiber-forming capability of this copolymer was better than film- and fiber-forming capability of the copolymer prepared in example 5.

Fiber casting ability was measured by heating to melt the copolymers prepared in examples 5 and 6. A glass rod was manually contacted with each copolymer and then moved away to see how far a fiber extended before break between the melted copolymer and the glass while the copolymer was a liquid.

INDUSTRIAL APPLICABILITY

The copolymers described herein do not suffer from the same drawbacks as the currently known PSZs. The new copolymers may be made by aminolysis of perchloro polysilanes with primary amines, ammonia, or silazanes. As a result, these copolymers are highly crosslinked and are free of Si—C bonds. These copolymers can be cast into films by many coating techniques, including SOD. Under proper cure conditions, the new copolymers can be converted to carbon-free SiN by transamination, or to SiON or SiO$_2$ by oxidation or hydrolysis. These copolymers have typical properties of polysilazanes such as high reactivity to hydrolysis and high flowability, and these copolymers have typical properties of polysilanes such as the formation of longer SiOSi bonding after oxidation. The copolymer may provide the advantage of undergoing thermal decomposition at a lower temperature than either polysilazanes or polysilanes.

Without wishing to be bound by theory, it is thought that thin films deposited from the copolymers described herein may have a higher reflowability at elevated temperatures than films deposited from HSQ resins. The structural change from silazanes (Si—N—Si) to siloxanes (Si—O—Si) during steam cure may allow the copolymer films to reflow at elevated temperatures. A thermal reflow is believed to help reduce film stress and improve film resistance to a chemical etchant, such as HF wet etchant. In addition, the copolymers may provide the benefit of being high ceramic yield precursors towards SiN under inert annealing conditions.

The invention claimed is:
1. A polysilane-polysilazane copolymer including:
a first polysilane unit of formula

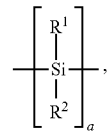

and
a polysilazane unit of formula

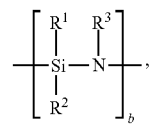

where
R$^1$ and R$^2$ are each independently selected from H, Si, and N atoms, and
R$^3$ is selected from H, Si, or C atoms,
a≥1,
b≥1, and
a quantity (a+b)≥2; and
where the copolymer is free of SiC bonds.

2. The copolymer of claim 1, having a formula:

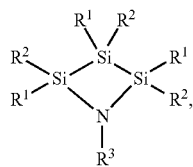

where $R^1$ and $R^2$ are each independently selected from H, Si, and N atoms, and $R^3$ is selected from H, Si, or C atoms.

3. The copolymer of claim 1, further including a unit of formula

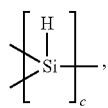

where $c \geq 1$,
a second polysilane unit of the formula

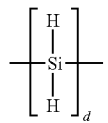

where $d \geq 1$, or both,
with the proviso that the first polysilane unit and the second polysilane unit are different.

4. A composition comprising:
(a) 5% to 20% of the copolymer of claims 1, and
(b) 80% to 95% of a solvent.

5. A method comprising:
1) applying the copolymer of claims 1, or a composition comprising thereof, to a substrate to form a film, and
2) heating the film.

6. The method of claim 5, where step 1) is performed by spin coating, extrusion coating, dip coating or spray coating.

7. The method of claim 5, where the substrate is a semiconductor wafer having a nano-scale trench thereon, where the nano-scale trench has an aspect ratio of 6 to 60.

8. The method of claim 5, where step 2) comprises i) a low temperature moisture soaking step and ii) a high temperature annealing step.

9. The method of claim 8, where step i) comprises exposing the film to atomspheric moisture or steam at a temperature ranging from 22° C. to 200° C. for 30 minutes to 60 minutes, and thereafter heating the film at a temperature of at least 400° C. for 30 minutes to 60 minutes.

10. The method of claim 8, where step ii) comprises heating the film at a temperature ranging from 600° C. to 900° C., in an environment comprising $N_2O$, $N_2$, or steam.

11. A product prepared by the method of claim 5.

12. A method for preparing the copolymer of claim 1, comprising:
I) reacting a perchloro polysilane having at least 2 silicon atoms per molecule with a compound selected from the group consisting of amines, ammonia, and silazanes.

13. The method of claim 12, where the perchloro polysilane includes perchloroneopentasilane.

14. The method of claim 12, where $H_2SiCl_2$, $HSiCl_3$, or a combination thereof, is included in step I).

15. The method claim 12, further comprising II) heating the product of step I) in an inert environment.

16. A method of forming insulating structure on an electronic substrate, comprising depositing the copolymer of claims 1 in a nano-scale trench formed in the electronic substrate.

17. A method of using the copolymer of claim 1 for fiber casting.

* * * * *